United States Patent
Szabela et al.

(10) Patent No.: US 6,945,350 B2
(45) Date of Patent: Sep. 20, 2005

(54) STEERING APPARATUS FOR TURNING MULTIPLE SETS OF STEERABLE VEHICLE WHEELS

(75) Inventors: William A. Szabela, Brookston, IN (US); Daniel E. Williams, W. Lafayette, IN (US); Kenneth A. Sherwin, W. Lafayette, IN (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 10/228,767

(22) Filed: Aug. 27, 2002

(65) Prior Publication Data

US 2004/0040780 A1 Mar. 4, 2004

(51) Int. Cl.[7] ................................................. B62D 5/04
(52) U.S. Cl. ...................... 180/411; 180/413; 180/445; 180/446
(58) Field of Search ............................... 180/445, 443, 180/444, 446, 402, 407, 408, 411, 412, 413

(56) References Cited

U.S. PATENT DOCUMENTS

| | | | |
|---|---|---|---|
| 4,741,409 A | * | 5/1988 | Westercamp et al. ....... 180/413 |
| 4,942,532 A | | 7/1990 | Mori |
| 4,953,648 A | | 9/1990 | Ohmura |
| 4,953,650 A | | 9/1990 | Ohmura |
| 5,083,626 A | | 1/1992 | Abe et al. |
| 5,083,628 A | | 1/1992 | Kanazawa et al. |
| 5,101,922 A | | 4/1992 | Ohmura |
| 5,137,291 A | | 8/1992 | Woods et al. |
| 5,226,499 A | * | 7/1993 | Kanazawa et al. .......... 180/412 |
| 5,257,191 A | | 10/1993 | Takehara et al. |
| 5,289,891 A | * | 3/1994 | Sugiyama .................... 180/412 |
| 5,327,986 A | * | 7/1994 | Saita ........................... 180/446 |
| 5,341,891 A | * | 8/1994 | Wada et al. ................. 180/445 |
| 5,427,195 A | | 6/1995 | Paul et al. |
| 5,810,108 A | | 9/1998 | Jung et al. |
| 5,828,972 A | * | 10/1998 | Asanuma et al. ............. 701/41 |
| 5,899,292 A | | 5/1999 | Paul et al. |
| 6,208,923 B1 | * | 3/2001 | Hommel ....................... 701/42 |
| 6,345,681 B1 | * | 2/2002 | Hackl et al. ................. 180/402 |
| 6,394,218 B1 | | 5/2002 | Heltzer |
| 6,505,700 B2 | * | 1/2003 | Furumi et al. .............. 180/412 |
| 6,548,969 B2 | * | 4/2003 | Ewbank et al. ............... 318/34 |
| 2001/0030075 A1 | | 10/2001 | Furumi et al. |

FOREIGN PATENT DOCUMENTS

DE     299 15 559     2/2000

\* cited by examiner

*Primary Examiner*—Anne Marie Boehler
(74) *Attorney, Agent, or Firm*—Tarolli, Sundheim, Covell & Tummino L.L.P.

(57) ABSTRACT

A steering apparatus (10) for turning steerable wheels of a vehicle having first and second sets (14 and 16) of steerable wheels comprises a first steering gear (22) actuatable, in response to rotation of a handwheel (110), to effect turning of the first set (14) of steerable wheels. The steering apparatus (10) also comprises second and third steering gears (24 and 26), each of which is independently actuatable to effect turning of the second set (16) of steerable wheels and thereby providing redundancy for turning of the second set (16) of steerable wheels. A sensor (112) senses a steering position of the first set (14) of steerable wheels and provides a steering signal indicative of the sensed steering position. A controller (114) receives the steering signal and, in response to the steering signal, controls actuation of the second and third steering gears (24 and 26).

4 Claims, 5 Drawing Sheets

STEERING APPARATUS FOR TURNING MULTIPLE SETS OF STEERABLE VEHICLE WHEELS

TECHNICAL FIELD

The present invention relates to a vehicle steering apparatus. More particularly, the present invention relates to a vehicle steering apparatus for turning first and second sets of steerable vehicle wheels.

BACKGROUND OF THE INVENTION

Vehicle steering systems for turning more than one set of steerable vehicle wheels are known. Typically, such a steering system is adapted to turn a front set and a rear set of vehicle wheels in response to rotation of a vehicle handwheel.

Such a steering system may include a selector switch for selecting the type of steering to be provided by the steering system. For example, the switch may include a first position that prevents turning of the rear set of steerable wheels and a second position that permits turning of the rear set of steerable wheels. When the switch is positioned in the second position, i.e., permitting the turning of the rear set of steerable wheels, rotation of the vehicle handwheel results in the turning of the front set of steerable wheels and, rotation of the handwheel beyond a predetermined angular position results in rotation of both the front set and the rear set of steerable wheels.

SUMMARY OF THE INVENTION

The present invention relates to a steering apparatus that is responsive to rotation of a handwheel for turning steerable wheels of a vehicle having first and second sets of steerable wheels. The steering apparatus comprises a first steering gear actuatable to effect turning of the first set of steerable wheels. The first steering gear is actuated in response to rotation of the handwheel. The steering apparatus also comprises second and third steering gears. Each of the second and third steering gears is independently actuatable to effect turning of the second set of steerable wheels. Thereby, the second and third steering gears provide redundancy for turning of the second set of steerable wheels. The steering apparatus further includes a sensor and a controller. The sensor senses a steering position of the first set of steerable wheels and provides a steering signal indicative of the sensed steering position. The controller receives the steering signal and, in response to the steering signal, controls actuation of the second and third steering gears.

BRIEF DESCRIPTION OF THE DRAWINGS

The foregoing and other features of the present invention will become apparent to those skilled in the art to which the present invention relates upon reading the following description with reference to the accompanying drawings, in which.

DETAILED DESCRIPTION OF THE INVENTION

Figure 1:
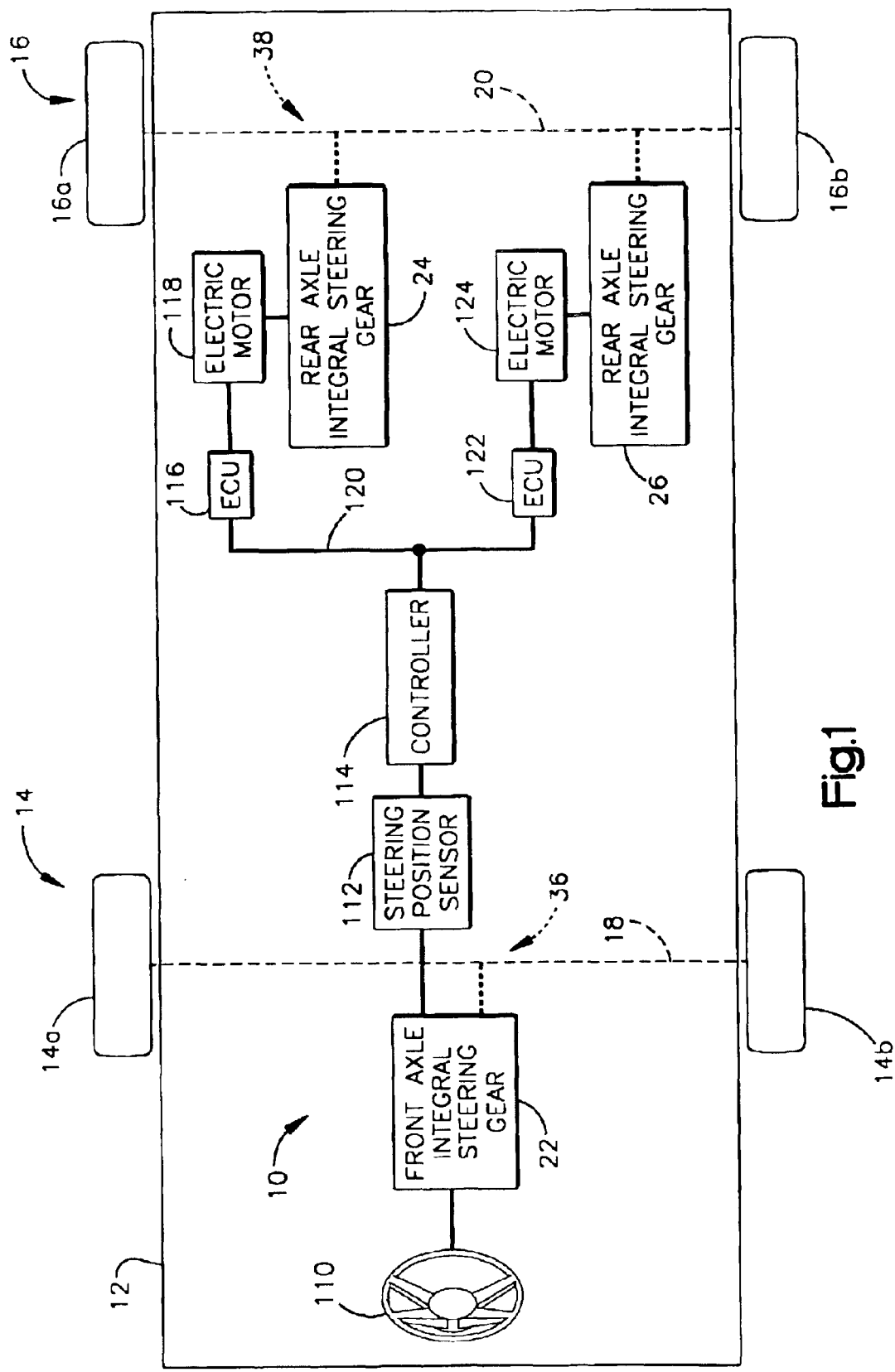
FIG. 1 is a schematic block diagram illustrating a steering apparatus constructed in accordance with the present invention.

FIG. 1 is a schematic block diagram illustrating a steering apparatus 10 constructed in accordance with the present invention. The steering apparatus 10 is mounted to a vehicle 12 having a front set 14 of steerable wheels and a rear set of 16 of steerable wheels. The front set 14 of steerable wheels includes wheels 14a and 14b and the rear set 16 of steerable wheels includes wheels 16a and 16b. Wheels 14a and 14b are mounted on opposite ends of a front axle 18 in a manner such that operation of a front steering linkage 36 results in turning of wheels 14a and 14b. Likewise, wheels 16a and 16b are mounted on opposite ends of a rear axle 20 in a manner such that operation of a rear steering linkage 38 results in turning of wheels 16a and 16b.

The steering apparatus 10 includes a front steering gear 22 and two rear steering gears 24 and 26, respectively. Preferably, the front steering gear 22 and the rear steering gears 24 and 26 are integral steering gears. An exemplary integral steering gear 34 that may be used for the front steering gear 22 and the rear steering gears 24 and 26 is illustrated in FIG. 2.

Figure 2:
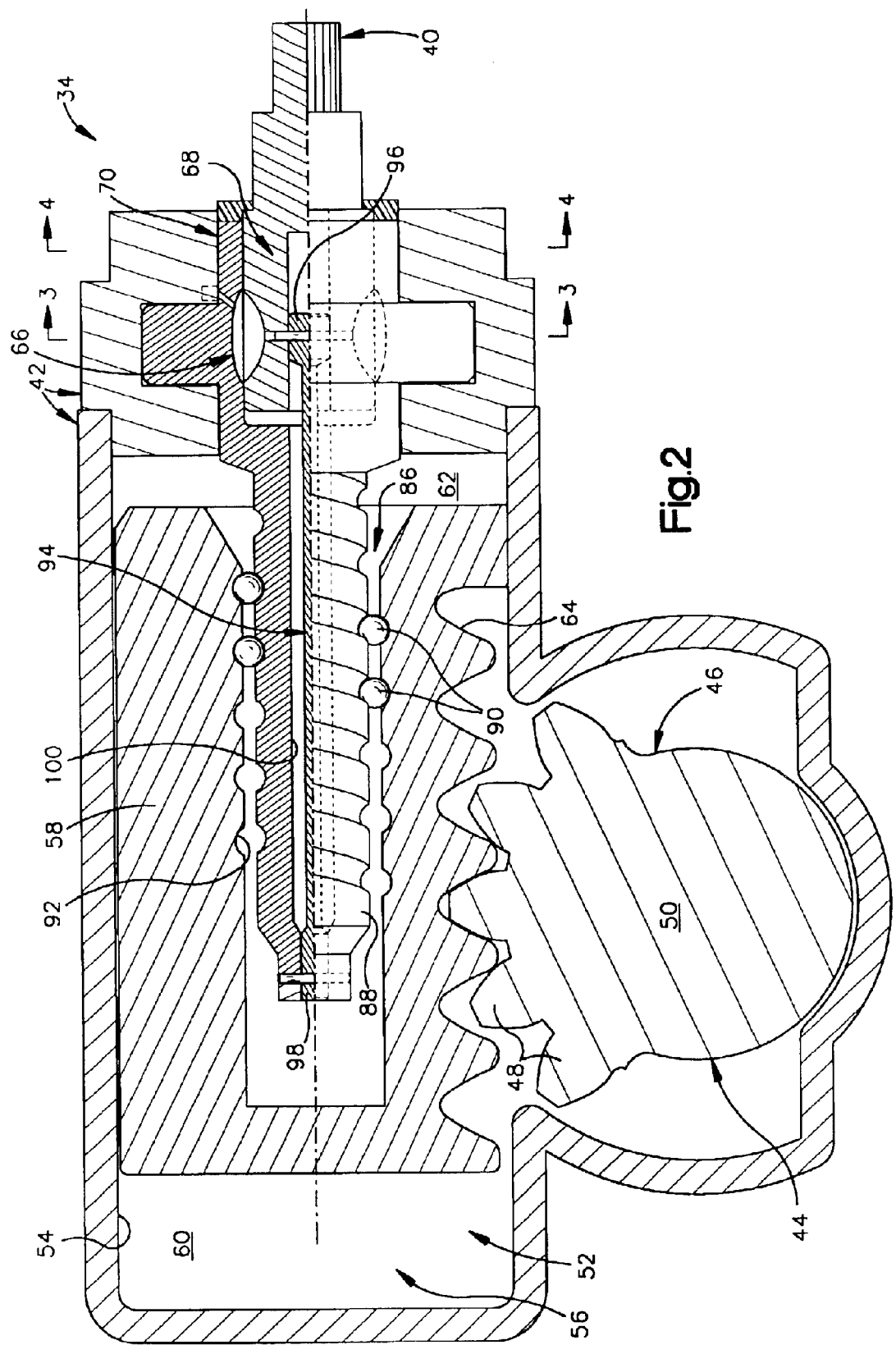
FIG. 2 illustrates an integral steering gear, in partial section, of the type that may be used in the steering apparatus of FIG. 1.

The integral steering gear 34 of FIG. 2 includes a housing 42 and a drive mechanism 44. The drive mechanism 44 is moved in response to rotation of an input shaft 40 of the integral steering gear 34. The drive mechanism 44 includes a sector gear 46 having a plurality of teeth 48. The sector gear 46 is fixed on an output shaft 50 that extends outwardly through an opening in the housing 42 of the integral steering gear 34. The output shaft 50 is typically connected to a pitman arm (not shown) that is, in turn, connected to the steering linkage associated with the integral steering gear 34. The steering linkage, shown schematically at 36, associated with the front steering gear 22 includes the front axle 18 and the steering linkage, shown schematically at 38, associated with the rear steering gears 24 and 26 includes the rear axle 20. Thus, as the sector gear 46 rotates, the output shaft 50 is rotated to operate the associated steering linkage 36 or 38. As a result, the associated steering linkage 36 or 38 is operated and the steerable wheels 14a and 14b or 16a and 16b associated with the axle 18 or 20 are turned.

The integral steering gear 34 further includes a hydraulic motor 52 for moving the drive mechanism 44. The hydraulic motor 52 is located within the housing 42 of the integral steering gear 34. The housing 42 of the integral steering gear 34 has an inner cylindrical surface 54 defining a chamber 56. A piston 58 is located within the chamber 56 and divides the chamber 56 into opposite chamber portions 60 and 62. One chamber portion 60 is located on a first side of the piston 58 and the other chamber portion 62 is located on a second side of the piston 58. The piston 58 creates a seal between the respective chamber portions 60 and 62 and is capable of axial movement within the chamber 56.

A series of rack teeth 64 is formed on the periphery of the piston 58. The rack teeth 64 act as an output for the hydraulic motor 52 and mesh with the teeth 48 formed on the sector gear 46 of the drive mechanism 44. When the piston 58 moves axially, the rack teeth 64 of the piston 58 interact with the teeth 48 of the sector gear 46 to rotate the sector gear 46.

A pump (not shown) supplies hydraulic fluid from a reservoir (not shown) to the hydraulic motor 52. Typically, the engine (not shown) of the vehicle drives the pump.

However, the pump could be driven otherwise, such as by a dedicated electric motor. The pump forces hydraulic fluid into an inlet (not shown) of the housing 42. The inlet directs the flow of the fluid to a directional control valve 66, shown in detail in FIG. 3.

The directional control valve 66 directs the fluid to an appropriate chamber portion 60 or 62 of the hydraulic motor 52. The flow of hydraulic fluid toward one of the chamber portions 60 or 62 increases the pressure within that chamber portion 60 or 62. When the pressure of one chamber portion 60 or 62 increases relative to the pressure of the other chamber portion 60 or 62, the piston 58 moves axially until the pressure within chamber portions 60 and 62 again equalizes. As the piston 58 moves axially, the volume of one chamber portion, e.g., chamber portion 60, increases and the volume of the other chamber portion, e.g., chamber portion 62, decreases. The decreasing chamber portion is vented to allow a portion of the fluid contained in the decreasing chamber portion to escape. The escaping fluid exits the housing 42 via a return (not shown) and is directed into the reservoir.

Figure 3:
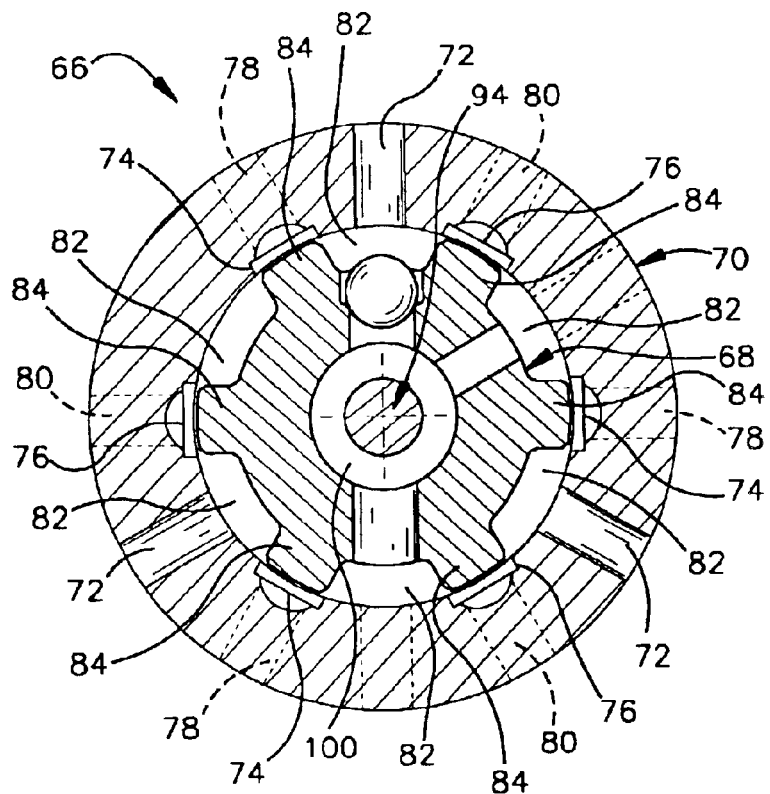
FIG. 3 is a view taken along line 3—3 in FIG. 2.

An embodiment of the directional control valve 66 is shown in FIG. 3. The directional control valve 66 contains a valve core part 68 and a valve sleeve part 70. A portion of the valve core part 68 is contained within and is rotatable relative to the valve sleeve part 70.

The valve sleeve part 70 includes three radially directed passages 72 that extend from an outer circumference of the valve sleeve part 70 to an inner circumference of the valve sleeve part. Each of these radial passages 72 is supplied with hydraulic fluid that enters the housing 42 through the inlet. Two axially extending grooves 74 and 76 are associated with each radial passage 72. The axially extending grooves 74 and 76 are located on the inner circumference of the valve sleeve part 70. As shown in FIG. 3, one groove 76 is located clockwise from each radial passage 72 and one groove 74 is located counter-clockwise from each radial passage 72. The grooves 74 and 76 are equidistant from a respective radial passage 72. Each groove 74 leads to a passage 78 extending radially outwardly through the valve sleeve part 70. Each groove 76 leads to a passage 80 extending radially outwardly through the valve sleeve part 70. Each groove 74 and 76 and associated passage 78 and 80 is associated with a particular chamber portion 60 and 62 of the hydraulic motor 52. For example, with reference to FIG. 3, each groove 76 and associated passage 80 located immediately clockwise of a radial passage 72 will supply hydraulic fluid to chamber portion 62; whereas, each groove 74 and associated passage 78 located immediately counter-clockwise from a radial passage 72 will supply hydraulic fluid to chamber portion 60.

Six grooves 82 are located around the outer circumference of the valve core part 68. The valve core part 68 also includes six protrusions 84 or lands. A protrusion 84 separates adjacent grooves 82 on the outer circumference of the valve core part 68. Side walls of the protrusion 84 form side walls of the grooves 82.

When the valve core part 68 is located relative to the valve sleeve part 70 such that each protrusion 84 of the valve core part 68 is centered relative to a respective groove 74 or 76 of the valve sleeve part 70, the directional control valve 66 is in a neutral position. FIG. 3 illustrates the directional control valve 66 in the neutral position. In the neutral position, the pressure within each chamber portion 60 and 62 of the hydraulic motor 52 is the same so that the piston 58 is stationary. When the valve core part 68 is rotated relative to the valve sleeve part 70, access to one of the two associated grooves 74 or 76 of the valve sleeve part 70 is restricted by a protrusion 84 of the valve core part 68, while access to the other of the two associated grooves 74 or 76 is increased. This allows a greater amount of the hydraulic fluid to flow toward the open groove 74 or 76, resulting in an increase in pressure of the respective chamber portion 60 or 62 associated with that groove 74 or 76. As a result of the increased pressure within the respective chamber portion 60 or 62, the piston 58 of the hydraulic motor 52 is moved.

As an example, assuming that the valve core part 68 is rotated clockwise as viewed in FIG. 3, the groove 74 of the valve sleeve part 70 located on the counter-clockwise side of the radial passage 72 becomes blocked and the groove 76 located on the clockwise side of the radial passage 72 becomes open. Thus, a greater amount of the hydraulic fluid is directed toward the open groove 76. Pressure in the chamber portion 62 of the hydraulic motor 52 associated with the open groove 76 is increased relative to the pressure in chamber portion 60. As a result, the piston 58 is moved in an axial direction, leftward in FIG. 2, and rotates the sector gear 46, causing the steerable wheels of the vehicle to be turned in the appropriate direction.

The piston 58 of the hydraulic motor 52 contains a bore 86 (FIG. 2) that is open toward the directional control valve 66. The valve sleeve part 70 and a follow-up member 88 form an integral one-piece unit that is supported for rotation relative to the piston 58 by a plurality of balls 90. The outer periphery of the follow-up member 88 is threaded. The plurality of balls 90 interconnects the threaded outer periphery of the follow-up member 88 with an internal thread 92 formed in the bore 86 of the piston 58. As a result of the interconnecting plurality of balls 90, axial movement of the piston 58 causes the follow-up member 88 and the valve sleeve part 70 to rotate. The rotation of the follow-up member 88 and the valve sleeve part 70 returns the directional control valve 66 to the neutral position.

Figure 4:
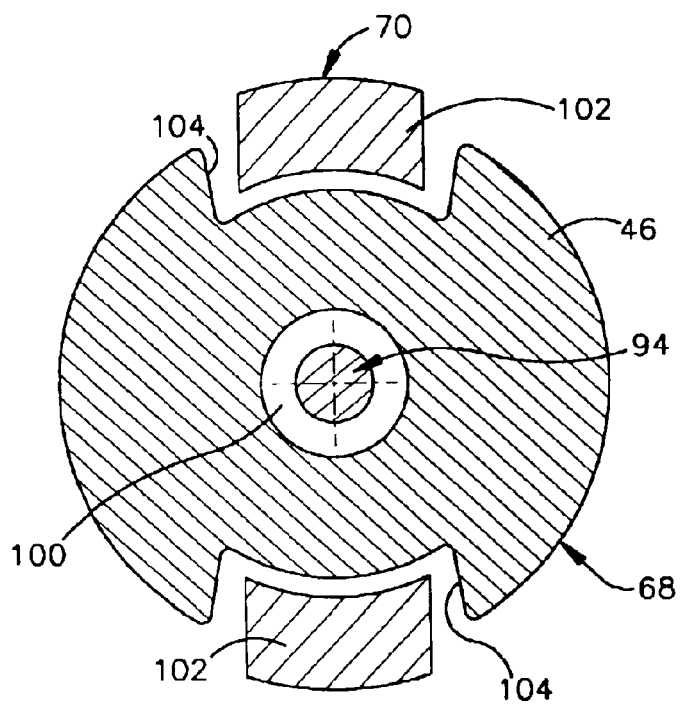
FIG. 4 is a view taken along line 4—4 in FIG. 2.

The valve core part 68 of the directional control valve 66 is fixedly connected to the input shaft 40 (FIG. 2). A first end 96 of a torsion bar 94 is fixed relative to the input shaft 40 and the valve core part 68. A second end 98 of the torsion bar 94 is fixed relative to the valve sleeve part 70 and the follow-up member 88. At least a portion of the torsion bar 94 extends through an axially extending bore 100 in the valve core part 68, as shown in FIGS. 2–4.

When the resistance to turning of the steerable wheels of the vehicle is below a predetermined level, rotation of the input shaft 40 of the integral steering gear 34 is transferred through the torsion bar 94 and causes rotation of the follow-up member 88. As a result, the directional control valve 66 remains in the neutral position. Rotation of the follow-up member 88 causes movement of the piston 58 and results in turning of the steerable wheels.

When resistance to turning the steerable wheels of the vehicle is at or above the predetermined level, rotation of the follow-up member 88 is resisted. As a result, rotation of the input shaft 40 of the integral steering gear 34 rotates the first end 96 of the torsion bar 94 relative to the second end 98 of the torsion bar. The rotation of the first end 96 of the torsion bar 94 relative to the second end 98 of the torsion bar twists the torsion bar 94 and causes the valve core part 68 to rotate relative to the valve sleeve part 70.

As discussed above, when the valve core part 68 rotates relative to the valve sleeve part 70, hydraulic fluid is directed toward one of the chamber portions 60 and 62. As a result, the piston 58 moves within the chamber 56. Movement of the piston 58 results in turning of the steerable wheels of the vehicle, as well as, rotation of the follow-up member 88. As discussed above, rotation of the follow-up member 88 rotates the valve sleeve part 70 until the directional control valve 66 is again in the neutral position. When the directional control valve 66 is in the neutral position, the twisting of the torsion bar 94 is removed and the first end 96 of the torsion bar 94 is no longer rotated relative to the second end 98 of the torsion bar.

As shown in FIG. 4, the valve sleeve part 70 also includes first and second lugs 102 that are disposed in diametrically opposed cut-outs 104 in the valve core part 68. Upon rotation of the valve core part 68 of between 2° and 8° relative to the valve sleeve part 70, the lugs 102 of the valve sleeve part 70 engage the cut-outs 104 in the valve core part 68 to cause the valve sleeve part 70 to be rotated along with the valve core part 68. Such rotation of the valve sleeve part 70 causes the piston 58 to move within the chamber 56 and, hence, allows for the steerable wheels of the vehicle to be turned by the turning of the input shaft 40 of the integral steering gear 34. Thus, even if a loss in hydraulic fluid pressure has occurred, turning the input shaft 40 of the integral steering gear 34 enables the turning of the steerable wheels of the vehicle.

With reference to FIG. 1, the front steering gear 22 is actuatable in response to rotation of a vehicle handwheel 110 to effect turning of the front set 14 of steerable wheels. The front steering gear 22 is operatively connected to the handwheel 110. An input shaft, similar to input shaft 40 of FIG. 2, of the front steering gear 22 may be directly connected to the handwheel 110. Alternatively, the input shaft of the front steering gear 22 may be actuated by an electric motor (not shown) that is responsive to operator-applied steering inputs to the handwheel 110.

The steering apparatus 10 also includes a steering position sensor 112. The steering position sensor 112 is adapted to sense a steering position of the first set 14 of steerable wheels and to provide a steering signal indicative of the sensed steering position. FIG. 1 schematically illustrates the steering position sensor 112 being operatively connected with the front steering gear 22 for monitoring a portion of the front steering gear to determine the steering position of the first set 14 of steerable wheels. For example, the steering position sensor 112 may sense rotation of an output shaft, similar to output shaft 50 of FIG. 2, of the front steering gear 22 to determine the steering position of the first set 14 of steerable wheels. Alternatively, the steering position sensor 12 may sense the movement of a portion of steering linkage 36, or the rotation of one or both of wheels 14a and 14b relative to a fixed reference.

The steering position sensor 112 is operatively connected to a controller 114. The controller 114 is preferably a microcomputer. The controller 114 receives the steering signal from the steering position sensor 112 and, in response to the steering signal, controls actuation of one or both of the rear steering gears 24 and 26.

Rear steering gear 24 is operative to effect operation of steering linkage 38 and turning of the second set 16 of steerable wheels. Rear steering gear 26 is also operative to effect operation of steering linkage 38 and turning of the second set 16 of steerable wheels.

An electronic control unit (ECU) 116 and an electric motor 118 are associated with rear steering gear 24. The ECU 116 is operatively connected to and controls energization of electric motor 118. ECU 116 is connected with the controller 114 via bus 120. ECU 116 and the controller 114 communicate with one another over bus 120. Thus, the bus 120 permits bi-directional communication between the controller 114 and ECU 116. Preferably, bus 120 is the CAN bus of the vehicle 12.

The controller 114 provides control messages to ECU 116. The control messages provided by the controller 114 direct ECU 116 when to energize electric motor 118 and indicate the steering position for the second set 16 of steerable wheels. In turn, ECU 116 provides a condition message to the controller 114. The condition message indicates any faults associated with energization of electric motor 118 and actuation of rear steering gear 24. The condition message also indicates the rear steering position into which the second set 16 of steerable wheels were actuated, after the energization of electric motor 118 and actuation of the rear steering gear 24. A rear steering position sensor (not shown) may be associated with ECU 116 for indicating the steering position of the second set 16 of steerable wheels. Alternatively, ECU 116 may monitor a rotor position sensor associated with electric motor 118 and use data received from the rotor position sensor to determine the steering position of the second set 16 of steerable wheels.

Electric motor 118 receives electrical power from a power source (not shown). The power source preferably includes the vehicle battery and power regulating devices. ECU 116 controls the energization, i.e., torque, amount of rotation, and direction of rotation, of electric motor 118. The output of the electric motor 118 is connected with an input shaft, similar to input shaft 40 in FIG. 2, of rear steering gear 24 so that rotation of the output of the electric motor results in rotation of input shaft of rear steering gear 24, i.e., actuation of rear steering gear 24. A gear assembly (not shown) may be used to connect the output of electric motor 118 to the input of rear steering gear 24.

An electronic control unit (ECU) 122 and an electric motor 124 are associated with rear steering gear 26. The ECU 122 is operatively connected to and controls energization of electric motor 124. ECU 122 is connected with the controller 114 via bus 120. ECU 122 and the controller 114 communicate with one another over bus 120. Thus, the bus 120 also permits bi-directional communication between the controller 114 and ECU 122.

The controller 114, in addition to providing control messages to ECU 116, provides control messages to ECU 122. The control messages provided by the controller 114 direct ECU 122 when to energize electric motor 124 and indicate the steering position for the second set 16 of steerable wheels. In turn, ECU 122 provides a condition message to the controller 114. The condition message indicates any faults associated with energization of electric motor 124 and actuation of rear steering gear 26. The condition message also indicates the steering position into which the second set 16 of steerable wheels were actuated, after the energization of electric motor 124 and actuation of rear steering gear 26.

Electric motor 124 receives electrical power from the power source (not shown). The power source preferably includes the vehicle battery and power regulating devices. ECU 122 controls the energization, i.e., torque, amount of rotation, and direction of rotation, of electric motor 124. The output of the electric motor 124 is connected with an input shaft, similar to input shaft 40 in FIG. 2, of rear steering gear 26 so that rotation of the output of the electric motor results in rotation of input shaft of rear steering gear, i.e., actuation of rear steering gear 26. A gear assembly (not shown) may be used to connect the output of electric motor 118 to the input of rear steering gear 26.

Figure 5:
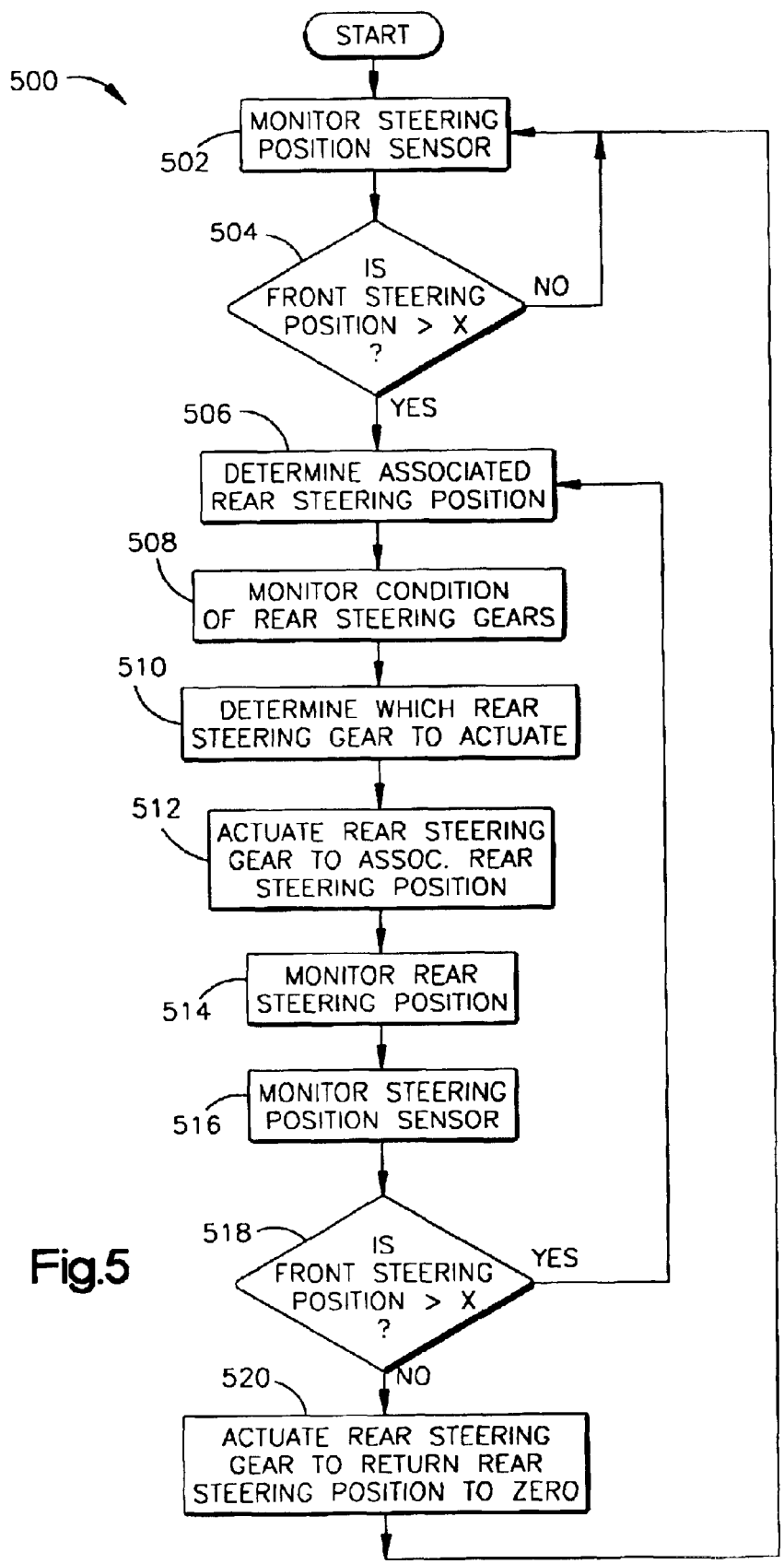
FIG. 5 is a flow diagram illustrating a control process that may be performed by a controller of the apparatus of FIG. 1.

FIG. 5 is a flow diagram illustrating a control process 500 that may be performed by the controller 114 in controlling actuation of one or both of the rear steering gears 24 and 26. After starting, the process 500 proceeds to step 502 and the controller 114 monitors the steering signal provided by the steering position sensor 112. At step 504, the controller 114 compares the steering position received in the steering signal to a predetermined threshold position, indicated as X, and determines whether the received steering position is greater than the predetermined threshold position X. If the determination at step 504 is negative, the process 500 returns to step 502. If the determination at step 504 is affirmative, the process 500 proceeds to step 506.

At step 506, the controller 114 determines a rear steering position associated with the received steering position. In performing step 506, the controller 114 may utilize a lookup table that is stored in a memory of the controller. Alternatively, the controller 114 may run an algorithm to calculate the rear steering position associated with the received steering position.

At step 508, the controller 114 monitors the condition of the rear steering gears 24 and 26. To monitor the condition of the rear steering gears 24 and 26, the controller 114 monitors the condition signals provided by ECU 116 and ECU 122. For example, if a fault arises in the use of rear steering gear 24, ECU 116 provides indication of the fault in the condition signal sent to the controller 114.

At step 510, the controller determines which of the rear steering gears 24 and 26 to actuate. Since the rear steering gears 24 and 26 are each independently operable to effect turning of the second set 16 of steerable wheels, the controller 114 may determine to actuate either of the rear steering gears, or alternatively, the controller may determine to actuate both rear steering gears 24 and 26 by equal amounts. In making the determination at step 510, the controller 114 considers the condition information received at step 508. For example, in the event that ECU 116 provides a fault indication to the controller 114, the controller 114 will actuate rear steering gear 26. The process 500 proceeds from step 510 to step 512.

At step 512, the controller 114 provides control messages to ECU 116 and ECU 122 directing each ECU whether or not to energize its associated electric motor 118 and 124, respectively, and if energizing, indicating a rear steering position into which the second set 16 of steerable wheels should be turned. At step 514, the controller 114 again monitors the condition signals from ECU 116 and ECU 122 to determine the steering position into which the second set 16 of steerable wheels were actuated. The process 500 then proceeds to step 516.

At step 516, the controller 114 again monitor steering signal from the steering position signal 112 to determine the steering position of the first set 14 of steerable wheels. At step 518, the controller 114 compares the steering position from step 516 to the predetermined threshold position X and determines whether the received steering position is greater than the predetermined threshold position X. If the determination at step 518 is affirmative, the process 500 returns to step 506. If the determination at step 518 is negative, the process 500 proceeds to step 520. At step 520, the controller 114 controls actuation of one or both of the rear steering gears 24 and 26 to return the steering position of the second set 16 of steerable wheels to a straight ahead or zero angle. From step 520, the process 500 returns to step 502.

Since the rear steering gears 24 and 26 are each independently operable to effect turning of the second set 16 of steerable wheels, the controller 114 may control actuation of either one of the rear steering gears 24 and 26, or alternatively both of the rear steering gears 24 and 26, to effect turning of the second set 16 of steerable wheels. As a result, the steering apparatus 10 of the present invention provides redundancy for turning the second set 16 of steerable wheels.

When only one of the rear steering gears 24 and 26 is actuated to effecting turning of the second set 16 of steerable wheels, the unactuated rear steering gear 24 or 26 is affected by operation of the steering linkage 38. For example, assuming that rear steering gear 24 is actuated. As a result, the rear steering linkage 38 operates and the second set 16 of steerable wheels are turned. The operation of the rear steering linkage 38 also results in rotation of the output shaft, similar to output shaft 50 of FIG. 2, of rear steering gear 26. Rotation of the output shaft of rear steering gear 26 results in movement of the piston, similar to piston 58 of FIG. 2, of rear steering gear 26 by an amount equal to the movement of the piston of rear steering gear 24, assuming rear steering gears 24 and 26 are identical and are connected to rear axle 20 in an identical manner. The movement of the piston of rear steering gear 26 results in rotation of the input shaft of rear steering gear 26. Since the input shaft of rear steering gear 28 is connected with an output, i.e., the rotor, of the electric motor 124, rotation of the input shaft of rear steering gear 26 results in rotation of the rotor of the electric motor 124 relative to the stator of the electric motor. Likewise, when the only rear steering gear 26 is actuated, the rotor of the electric motor 118 is rotated relative to the stator of the electric motor 118.

When both of the rear steering gears 24 and 26 are actuated to effect turning of the second set 16 of steerable wheels and rear steering gears 24 and 26 are identical and are connected to rear axle 20 in an identical manner, each of the rear steering gears 24 and 26 is actuated an equal amount. As a result, the pistons, like piston 58 of FIG. 2, of the rear steering gears 24 and 26 are moved equal amount and the output shafts, similar to output shaft 50 of FIG. 2, of each rear steering gear 24 and 26 is rotated an equal amount.

Thus, the steering apparatus 10 of the present invention includes a front steering gear 22 that is actuated in response to rotation of the handwheel 110 to effect turning of the first set 14 of steerable wheels. A steering position sensor 112 provides a steering signal indicative of the steering position of the first set 14 of steerable wheels to a controller 114. The controller 114, in response to the steering signal, controls actuation of at least one of the rear steering gears 24 and 26 to effect turning of the second set 16 of steerable wheels.

Figure 6:
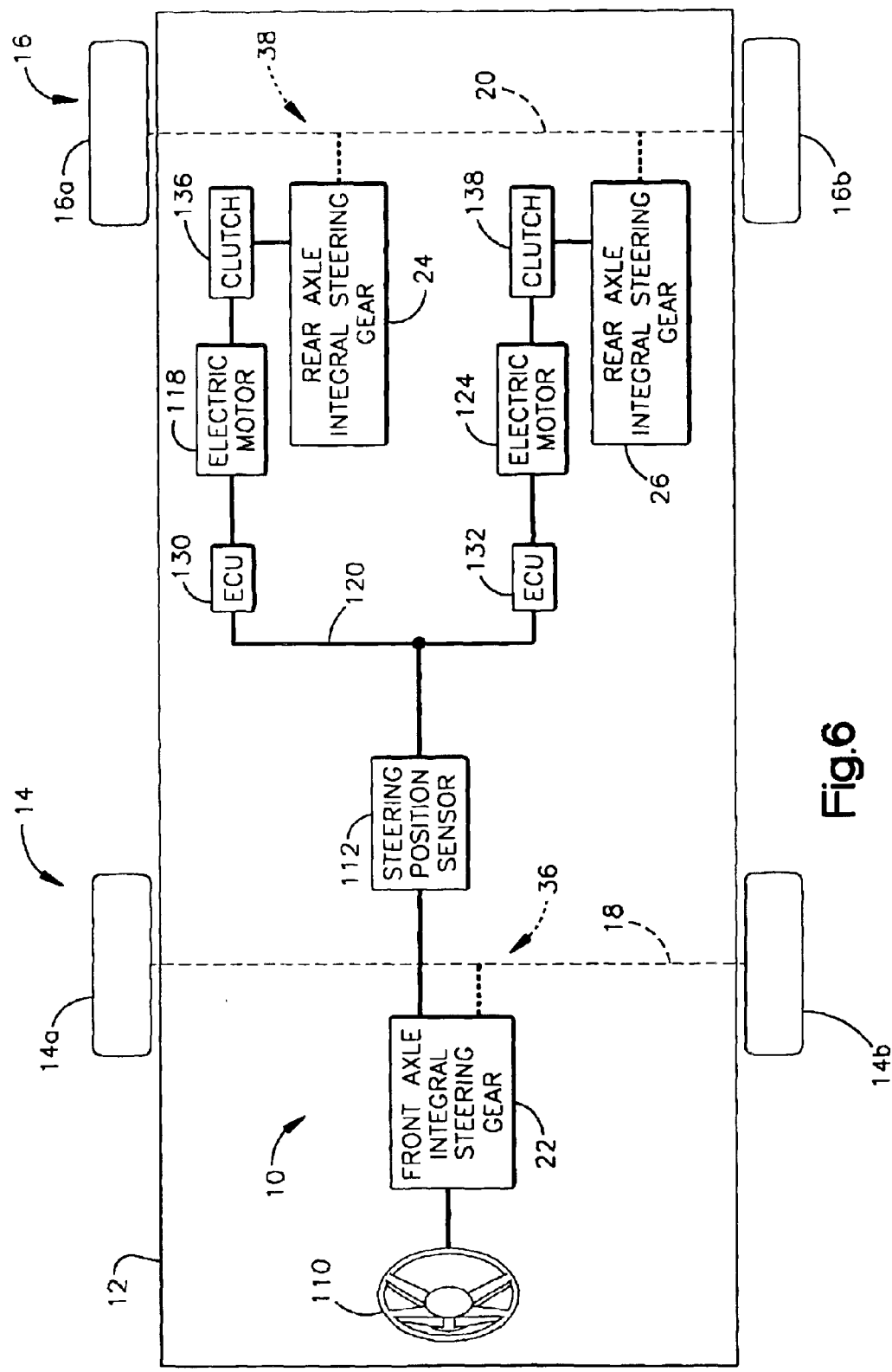
FIG. 6 is a schematic block diagram illustrating a steering apparatus constructed in accordance with a second embodiment of the present invention.

FIG. 6 is a schematic block diagram illustrating a steering apparatus 10 constructed in accordance with a second embodiment of the present invention. FIG. 6 indicates structures that are the same or similar to those introduced with reference to FIG. 1 with the same reference number as was used in FIG. 1.

In the steering apparatus 10 of FIG. 6, ECU 130 is associated with electric motor 118 and rear steering gear 24 and ECU 132 is associated with electric motor 124 and rear steering gear 26. The steering apparatus 10 of FIG. 6 does not include the controller 114 shown in FIG. 1; instead, the steering position sensor 112 is connected with ECU 130 and ECU 132 via bus 120. The steering position sensor 112 provides the steering signal to ECU 130 and ECU 132. ECU 130 and ECU 132 communicate with one another over bus 120 to control actuation of at least one of the rear steering gears 24 and 26.

Preferably, in the steering apparatus 10 of FIG. 6, one ECU, e.g., ECU 130, is the master and the other ECU, e.g. 132, is the slave. Thus, the master ECU controls actuation of both rear steering gears 24 and 26. The master ECU may perform a control process similar to the control process 500 illustrated in FIG. 5.

FIG. 6 also includes clutches 136 and 138. Clutch 136 is operatively connected between electric motor 118 and rear steering gear 24 and clutch 138 is operatively connected between electric motor 124 and rear steering gear 26. Clutch 136 engages, permitting the transfer of energy, when electric motor 118 is energized so that rotation of an output of the electric motor 118 results in actuation of rear steering gear 24. Clutch 136 disengages, preventing the transfer of energy, when electric motor 118 is not energized so that any movement of the input shaft of rear steering gear 24 resulting from actuation of only rear steering gear 26 is not transferred to the electric motor 118. Likewise, clutch 138 engages when electric motor 124 is energized and disengages when electric motor 124 is not energized. Thus, when only one of the rear steering gears 24 and 26 is actuated, any movement transferred to the other rear steering gear 24 or 26 is not transferred to its associated electric motor 118 or 124.

From the above description of the invention, those skilled in the art will perceive improvements, changes and modifications. Such improvements, changes and modifications within the skill of the art are intended to be covered by the appended claims.

Having described the invention, we claim the following:

1. A steering apparatus responsive to rotation of a handwheel for turning steerable wheels of a vehicle having first and second sets of steerable wheels, said steering apparatus comprising:

a first steering linkage connected with the first set of steerable wheels;

a first steering gear connected with said first steering linkage, said first steering gear being actuatable to effect operation of said first steering linkage and turning of said first set of steerable wheels in response to rotation of the handwheel;

a second steering linkage connected with the second set of steerable wheels;

second and third steering gears connected with said second steering linkage, said second and third steering gears each being independentably actuatable to effect turning of the second set of steerable wheels and thereby providing redundancy for turning of the second set of steerable wheels;

said second steering gear includes a first hydraulic motor connected with said second steering linkage and a first control valve which is operable to direct fluid pressure to said first hydraulic motor;

said third steering gear includes a second hydraulic motor connected with said second steering linkage and a second control valve which is operable to direct fluid pressure to said second hydraulic motor;

a first electric motor connected with said first control valve and operable to effect operation of said first control valve to direct fluid pressure to said first hydraulic motor to effect operation of said first hydraulic motor and said second steering linkage under the influence of fluid pressure, and a second electric motor connected with said second control valve and operable to effect operation of said second control valve to direct fluid pressure to said second hydraulic motor to effect operation of said second hydraulic motor and said second steering linkage under the influence of fluid pressure.

2. The steering apparatus of claim 1 wherein said first hydraulic motor includes a first housing which at least partially encloses a first piston and a first follow-up member which is connected with said first piston and said first control valve, said first follow-up member being movable under the influence of force transmitted from said first electric motor through said first control valve to said first follow-up member, said first piston being movable relative to said first housing under the influence of force transmitted from said first follow-up member to said first piston to operate said second steering linkage, said second hydraulic motor includes a second housing which at least partially encloses a second piston and a second follow-up member which is connected with said second piston and said second control valve, said second follow-up member being movable under the influence of force transmitted from said second electric motor through said second control valve to said second follow-up member, said second piston being movable relative to said second housing under the influence of force transmitted from said second follow-up member to said second piston to operate said second steering linkage.

3. The steering apparatus of claim 1, wherein said first control valve is connected to said first hydraulic motor, said first electric motor being operable to transmit force through said first control valve to said first hydraulic motor, said second control valve is connected to said second hydraulic motor, said second electric motor being operable to transmit force through said second control valve to said second hydraulic motor.

4. A steering apparatus responsive to rotation of a handwheel for turning steerable wheels of a vehicle having first and second sets of steerable wheels, said steering apparatus comprising:

a first steering linkage connected with the first set of steerable wheels;

a first steering gear connected with said first steering linkage, said first steering gear being actuatable to effect operation of said first steering linkage and turning of said first set of steerable wheels in response to rotation of the handwheel;

a second steering linkage connected with the second set of steerable wheels;

a first sector gear connected with said second steering linkage;

a first externally toothed member disposed in meshing engagement with said first sector gear, said first externally toothed member having a central opening into which a first rotatable member extends;

a first housing which at least partially encloses said first externally toothed member, said first externally toothed member cooperates with said first housing to define first and second chambers, a first control valve which is connected in fluid communication with said first and second chambers and is operable to direct fluid flow to and from said first and second chambers to apply fluid pressure against said first externally toothed member a first motor connected with said first rotatable member, said first motor being operable to rotate said first rotatable member to move said first externally toothed member relative to said first sector gear to effect operation said second steering linkage and turning of said second set of steerable vehicle wheels a second sector gear connected with said second steering linkage;

a second externally toothed member disposed in meshing engagement with said second sector gear, said second externally toothed member having a central opening into which a second rotatable member extends; and a second housing which at least partially encloses said second externally toothed member, said second externally toothed member cooperates with said second housing to define third and fourth chambers, a second control valve which is connected in fluid communication with said third and fourth chambers and is operable to direct fluid flow to and from said third and fourth chambers to apply fluid pressure against said second externally toothed member, a second motor connected with said second rotatable member, said second motor being operable to rotate said second rotatable member to move said second externally toothed member relative to said second sector gear to effect operation of said second steering linkage and turning of said second set of steerable vehicle wheels.

* * * * *